C. VAN COTT.
OUTSIDE BRAKE.
APPLICATION FILED AUG. 9, 1919.

1,380,274.

Patented May 31, 1921.
2 SHEETS—SHEET 1.

WITNESSES

INVENTOR
CLIFTON VAN COTT
BY
ATTORNEYS

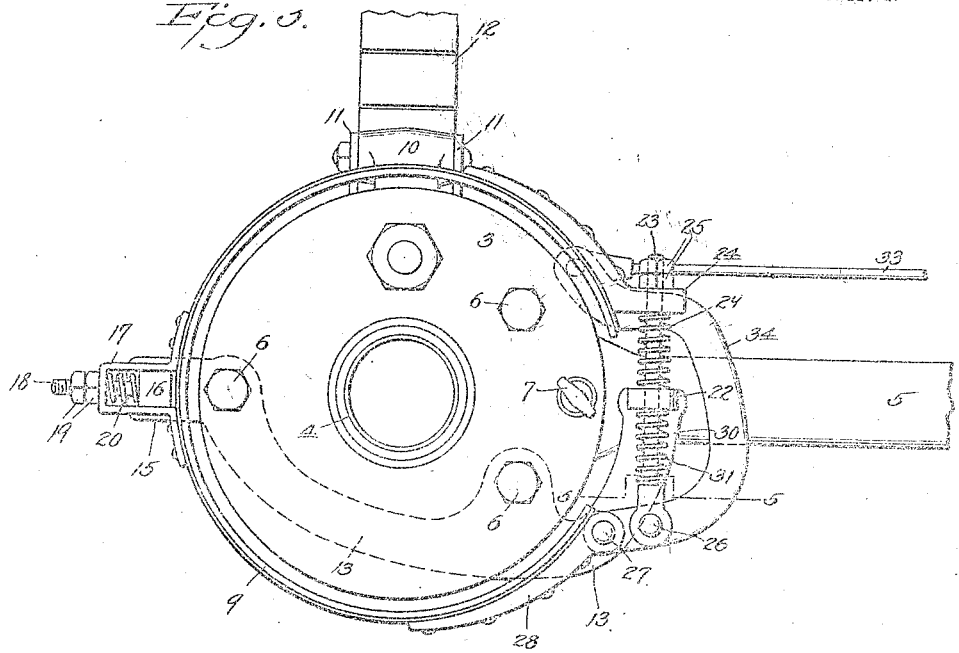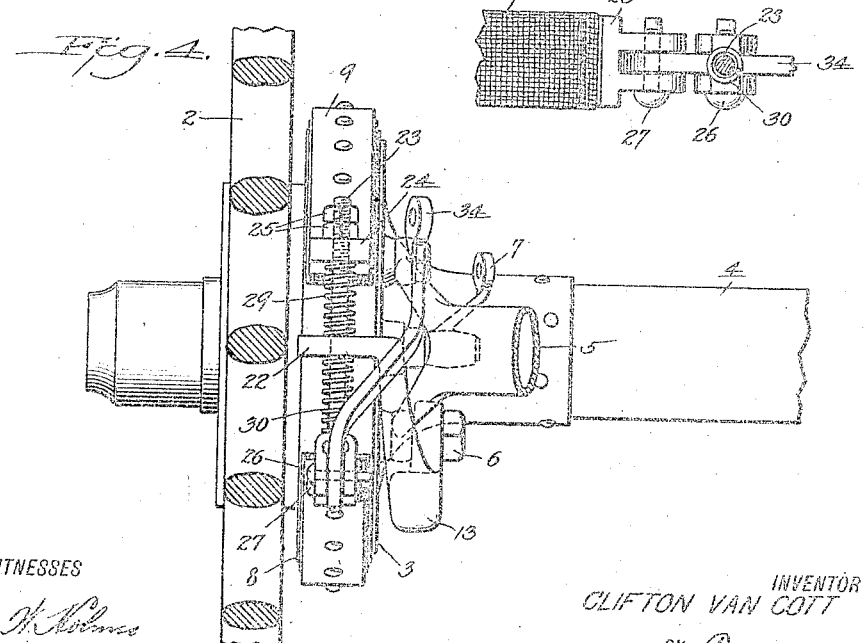

UNITED STATES PATENT OFFICE.

CLIFTON VAN COTT, OF COLD SPRING HARBOR, NEW YORK.

OUTSIDE BRAKE.

1,380,274.
Specification of Letters Patent.
Patented May 31, 1921.

Application filed August 9, 1919. Serial No. 316,325.

*To all whom it may concern:*

Be it known that I, CLIFTON VAN COTT, a citizen of the United States, and a resident of Cold Spring Harbor, county of Suffolk, and State of New York, have invented a new and Improved Outside Brake, of which the following is a full, clear, and exact description.

This invention relates to improvements in outside brakes and more particularly to an outside brake structure which can be applied to the brake drum of a well known type of automobile on the market which has heretofore been equipped with an inside brake structure.

To be more specific, a well known type of automobile on the market has heretofore been provided with a brake band located inside the drum, and it is the purpose of my invention to provide a structure which can be utilized on the outside of the same drum to take the place of the inside brake structure, and by this change I provide a brake which is readily accessible, which is not liable to get out of repair, but if it does, can be easily attended to.

A further object is to provide a brake which insures the uniform movement of the brake band in all directions toward or away from the brake drum so as to permit a quick acting effectual brake and a quick releasing of the brake band without danger of wear on the band when the latter is not applied.

With these and other objects in view, the invention consists in certain novel features of construction and combinations and arrangements of parts as will be more fully hereinafter described and pointed out in the claim.

In the accompanying drawings:

Fig. 3 is a view similar to Fig. 1 but of the opposite side of the brake, the drum being removed for clearness.

Fig. 4 is a view in front elevation partly in section.

Fig. 5 is a fragmentary view of one end of the brake band and attached part.

Figure 1:
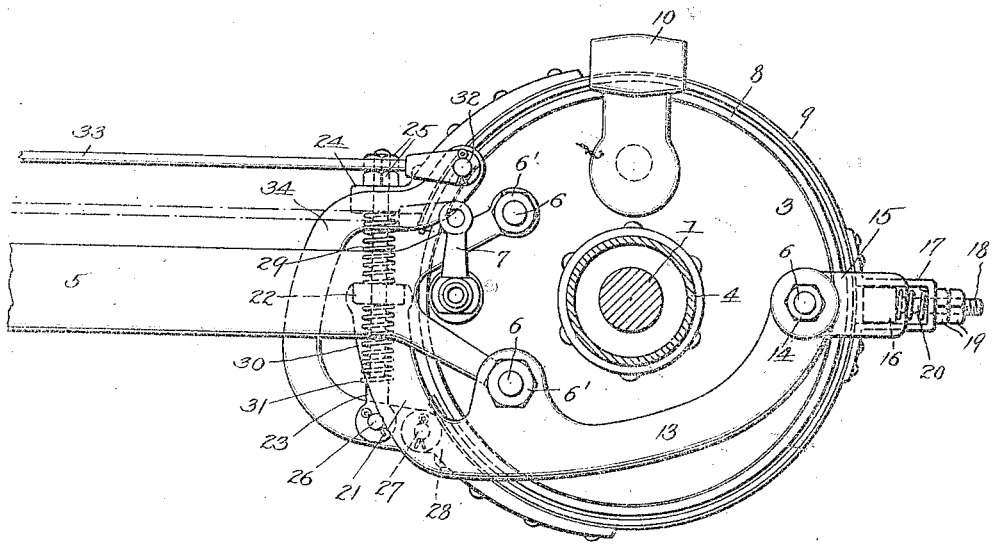
Figure 1 is a view in side elevation partly in section illustrating my improvements.

1 represents the axle and 2 the wheel of a type of automobile in common use, a disk 3 being employed and fixed to the axle casing 4. The disk is strengthened by brace 5 which, at its forked rear end, is secured by bolts 6 and nuts 6'. 7 represents a crank arm which was utilized to operate the internal brake and all of the structure above described is in common use on a well known type of automobile and is utilized with the exception of the crank arm 7 in connection with my improved outside brake, so that my improvements may be attached without changing the well known structure. It is of course understood that before my improvements are attached, the internal brake mechanism is removed and the rod 33, which was used to operate the crank arm 7 can be utilized to operate my improved brake as will hereinafter appear.

8 represents the brake drum which I utilize, applying my brake to the outside instead of to the inside as heretofore.

The brake band 9 may be of any suitable form and given a friction surface in any desired way, and is positioned around the outside of the drum 8. A bracket 10 is fixed to the disk 3 and connected by links 11 with the spring 12 of the lever.

A bracket arm 13 is secured at its intermediate portion on one of the bolts 6, and at its rear end is secured by bolt 14, these bolts 6 and 14 being secured in the stationary disk 3. An extension 15 is provided on the rear end of bracket arm 13, and has a block 16 integral therewith projecting laterally from the bracket arm 13 and positioned in a socket frame 17, the latter secured to the intermediate portion of the brake band 9. A threaded bolt 18 is fixed to the block 16, projects at right angles therefrom, and is movable through the outer end of the frame 17. Nuts 19 are screwed on to the outer end of the bolt 18 and a coiled spring 20 is located around the bolt between the block 16 and the outer end of the frame 17, exerting pressure on the frame tending to draw the intermediate portion of the brake band 9 away from the brake drum.

The bracket arm 13, at its forward end, is made with an upwardly curved portion 21, the latter having a laterally projecting perforated lug 22 receiving a vertical rod 23 therein. The upper end of the rod 23 projects through a perforated lug 24 on one end of the brake band 9, and nuts 25 are screwed on to the upper end of the rod and against the lug 24. The lower end of the rod 23 has a pivotal connection 26 with an operating lever 34. This pivotal connection 26 is slightly in advance of the pivotal connection 27 between the lower rear end of the lever 34, and a lug 28 on the other end of the brake band. A coiled spring 29 is located around the rod 23 between the perforated lugs 22 and 24. A second coiled spring 30 is located around the rod 23 between the perforated lug 22 and a shoulder 31 on the rod 23. These springs tend to force the ends of the brake band apart, while the spring 20 above referred to moves the intermediate portion of the brake band away from the brake drum, so that when the brake band is released its entire inner surface is moved away from the drum.

Figure 2:
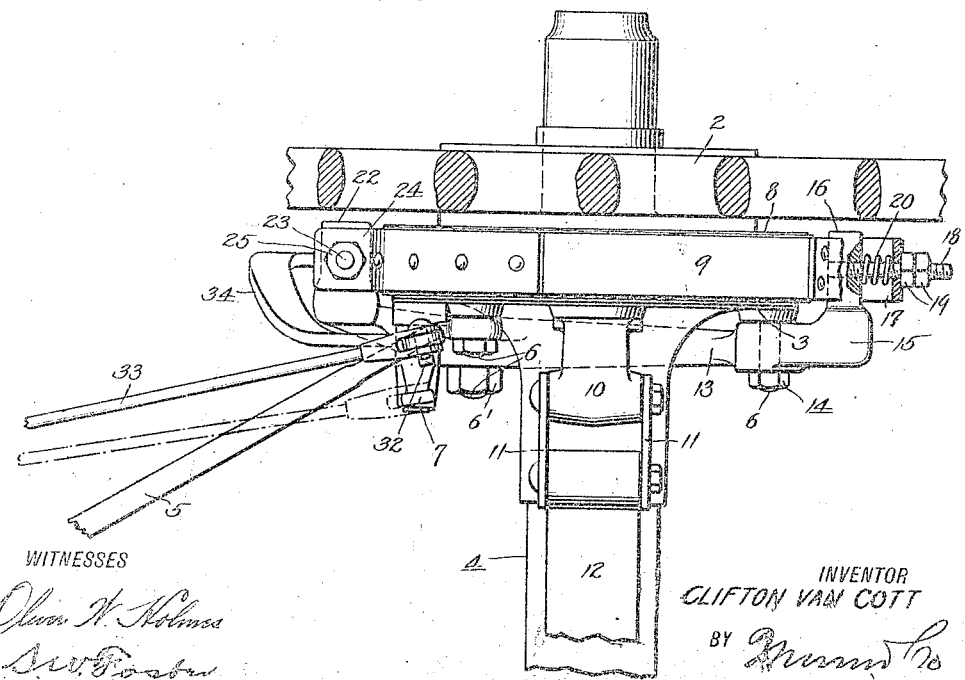
Fig. 2 is a top plan view of Fig. 1 with part shown in section.

The operating lever 34 above referred to not only curves upwardly and then rearwardly as shown in Fig. 1, but also projects laterally as shown clearly in Figs. 2 and 4, and is provided with an operating rod 33 having a pivotal connection 32 with the upper end of the lever 34.

The operation is as follows:

When the rod 33 is moved to the left of Fig. 1, the lever 34 will be swung forwardly and downwardly, causing the lever to fulcrum on the pivotal connection 26 as well as on the pivotal connection 27, so that through the medium of the rod 23, the upper lug 24 will be pulled downwardly, and through the medium of the lugs 24 and 27, the brake band will be drawn tightly around the drum 8 and the desired braking action can be had. When the pull on the rod 33 is released, the springs 29, 30 and 20 will draw the brake band away from the brake drum and hold the brake band in this position until it is again applied.

Various slight changes might be made in the general form and arranging of parts described without departing from my invention, and hence I do not limit myself to the precise details set forth, but consider myself at liberty to make such changes and alterations as fairly fall within the spirit and scope of the appended claim.

Having thus described my invention, what I claim as new and desire to secure by Letters Patent is:

The combination with a stationary disk, a rotary drum and a brake band around the drum, of a bracket arm fixed to the disk, an extension on the rear end of the bracket arm, a laterally projecting block on the extension integral with said bracket arm, a socket frame on the intermediate portion of the brake band, into which the said block projects, a bolt on the block extending through the outer end of the socket frame, a nut on the outer end of the bolt, a coiled spring around the bolt, between the block and the outer end of the frame tending to move the intermediate portion of the brake band away from the drum, an operating lever pivotally connected to one end of the brake band, a rod pivotally connected to the lever, a perforated lug on the other end of the brake band receiving the rod, a perforated lug on the bracket arm through which the rod projects, coiled springs around the rod above and below said last mentioned lug, holding the rod in place, one of said springs exerting pressure on one end of the brake band and the other of said springs exerting pressure on the rod.

CLIFTON VAN COTT.